United States Patent [19]

Medovar et al.

[11] Patent Number: 4,495,395
[45] Date of Patent: Jan. 22, 1985

[54] METHOD FOR ELECTROSLAG WELDING WITH CONSUMABLE PLATE ELECTRODES

[75] Inventors: Boris I. Medovar; Vladimir P. Andreev; Vladimir V. Kozik; Nikolai T. Shevchenko, all of Kiev; Dmitry U. Spisarenko, Kievskaya; Vladimir P. Malevanny, Kiev; Vladimir F. Karpov, Zhdanov Donetskoi; Viktor V. Chernykh, Moscow; Anatoly D. Chepurnoi, Zhdanov Donetskoi; Evgeny A. Matsegora, Kramatorsk Donetskoi; Lev A. Shuruev, Kiev, all of U.S.S.R.

[73] Assignee: Institut Elektrosvarki Imeni E.O.Patona, Kiev, U.S.S.R.

[21] Appl. No.: 419,918

[22] Filed: Sep. 20, 1982

[51] Int. Cl.³ .............................................. B23K 25/00
[52] U.S. Cl. ................................................... 219/73.1
[58] Field of Search .................... 219/73.1, 73.11, 73.2, 219/126

[56] References Cited

U.S. PATENT DOCUMENTS

| 3,578,938 | 5/1971 | Medovar et al. | 219/73.1 |
| 4,315,127 | 2/1982 | Ito et al. | 219/73.1 |
| 4,376,881 | 3/1983 | Safonnikov et al. | 219/73.1 |

FOREIGN PATENT DOCUMENTS 48-27059  8/1973  Japan ........................ 219/73.1

OTHER PUBLICATIONS

"Electroslag Furnaces" ed. by B. E. Paton and B. I. Medovar, 1976, pp. 226-228.

Primary Examiner—C. L. Albritton
Assistant Examiner—Catherine M. Sigda
Attorney, Agent, or Firm—Fleit, Jacobson, Cohn & Price

[57] ABSTRACT

Ground metallic adding material is fed into the welding gap. Electrodes are introduced into the gap in pairs, one electrode in a pair opposite the other, at an angle equal to the angle of divergence of the end faces being welded together. The electrodes are positioned so that their larger faces are parallel with the end faces being welded together and the smaller faces extend beyond the side surface of the workpiece being welded.

3 Claims, 2 Drawing Figures

METHOD FOR ELECTROSLAG WELDING WITH CONSUMABLE PLATE ELECTRODES

BACKGROUND OF THE INVENTION

1. Field of the Invention

The present invention relates to the art of welding and is specifically concerned with methods for electroslag welding with consumable plate electrodes.

The invention may find the most successful application in heavy and metallurgical machine building for manufacturing large-size and heavy blanks such as for rotors of large alternators, for supporting rolls of unique sheet mills, for trunnion plates of converters, etc.

2. Description of the Prior Art

Methods for electroslag welding of large-thickness blanks with electrodes either movable or stationary with respect to the end faces being welded together, wherein adding materials are fed onto the slag bath surface in the course of welding, are well known in the art.

One of electroslag welding methods involves feeding the adding material with the aid of a metallic or refractory tube which extends into the molten metal bath through the slag.

Such a method of feeding the adding material fails to provide a uniform distribution thereof along the weld axis. Strong electromagnetic fields between the electrodes and the walls of the workpiece being welded promote sticking of the adding material to the feeding tube, which eventually results in clogging the tube and thus terminating the feed of the material in the course of welding.

Feeding a large amount of the adding material on a relatively small portion of the welding gap upsets the thermal balance of electroslag welding process and brings about a chemical inhomogeneity of the weld metal over the depth thereof and hence also a nonuniformity of the physico-mechanical properties of the metal.

There is also known a method for electroslag welding with consumable plate electrodes ("Elektroshlakovye pechi" Ed. by B. E. Paton and B. I. Medovar. Kiev, "Naukova dumka", 1976, pp. 226–228).

When carrying out the conventional method of welding, the work-pieces to be welded are arranged on a bottom plate and the end faces thereof are set at the predetermined angle of divergence.

In welding by this method, use is taken of two pairs of consumable electrodes: one pair of movable electrodes fed into the welding-gap with the aid of an electrode holder adapted to move on a vertical guiding coloumn, and one pair of stationary electrodes installed with the aid of special brackets directly on blanks of workpieces to be welded. All the consumable electrodes are installed in one row along the edges to be welded.

The electrodes being installed, voltage is applied from a power transformer, whereupon a slag bath is established with the use of a siphon device. When the predetermined welding current is attained, a mechanism for vertically moving the movable consumable electrodes is switched on, and a round metallic adding material is fed into the spacing between the electrodes.

When the welding process is completed, the mechanism for moving the movable electrodes is switched off, feeding the ground adding material is stopped, the power transformer is switched off, the siphon device is removed, and the stubs of the electrodes are taken off.

With this method, however, the weld shrinkage strains cause the welding gap to open, i.e. the workpieces being welded together to turn relative to a vertical axis towards increasing the gap, at the initial moment of welding and to close in the process of welding.

Such a turning of the workpieces in one or other direction results in shifting the consumable electrodes from their initial position and hence in a random variation of the gaps between the electrodes and the workpieces under welding; this in its turn gives rise to an unsymmetrical nonuniform fusion of the edges and sometimes even to a lack of fusion of one of the edges over the weld height, and thus greatly degrades the quality of the weld joint.

Studies have revealed that variations in the distance between the electrodes and the surfaces being welded together also destabilize the welding process.

Moreover, welding together workpieces by this prior art method lowers the crystallization-crack resistance of the built-up metal because of the nonuniformity of fusion of the edges and consequent formation of a weld whose shape factor varies over its thickness.

SUMMARY OF THE INVENTION

The principal object of the present invention is to provide a method for electroslag welding, wherein a higher quality of the weld joint is attained through an innovative positioning of consumable plate electrodes.

Another object of the invention is to enhance the stability of the welding process.

One more object of the invention is to upgrade the dependability of running the welding process.

The above-mentioned and other objects of the invention are attained by that in a method for electroslag welding with consumable plate electrodes, wherein a ground metallic adding material is fed into the welding gap defined by end faces of workpieces being welded, according to the invention, said electrodes are introduced into the welding gap in pairs, one electrode in a pair opposite the other, at an angle equal to the angle of divergence of the end faces being welded together, the larger faces of the electrodes being parallel with the end faces being welded together and the smaller faces extending beyond the side surface of the workpiece being welded.

When the blanks being welded are turned through a required angle, the gaps between the stationary electrodes and the end faces of the blanks remain the same during the whole welding process, which ensures a uniform distribution of heat throughout the whole thickness of the weld, a uniform fusion of the edges, and, consequently, a higher crystallization-crack resistance of the weld metal.

It is advisable that the larger faces of the electrodes be spaced from end faces being welded together at a distance of 6 to 17% of the width of the smaller face thereof.

When the value of the gap is less than 6% of said width, there occur break-downs in the slag bath in the space between an electrode and a face end, which impairs the stability of the process. If the space is more than 17% of the width of the smaller face, there occur incomplete fusion of the edges and in the metal of the weld there appear unfused particles of the adding material.

The smaller faces may extend beyond the side surface of the work-piece being welded by 6 to 13% of the width of these faces.

If the electrodes extend beyond the lateral surface by less than 6% of the width of the smaller face thereof, there occurs incomplete fusion near the lateral surface of the workpiece, and if by more than 13%, there takes place weld reinforcement, which increases the specific quantity of metal of the waste products.

Such an accomplishment of the method provides for an uniform distribution of the heat input over the weld thickness, for a symmetrical uniform fusion of edges, and for a higher crystallization-crack resistance of the weld metal, inasmuch as the angular turning of the workpieces being welded together causes no changes in the gaps between the fixed consumable electrodes and the workpiece faces being welded together over the entire welding process.

BRIEF DESCRIPTION OF THE DRAWINGS

The above-mentioned and other objects and advantages of the present invention will be apparent from the following detailed description of an embodiment thereof with reference to the accompanying drawings, wherein.

DETAILED DESCRIPTION OF THE INVENTION

Figure 1:
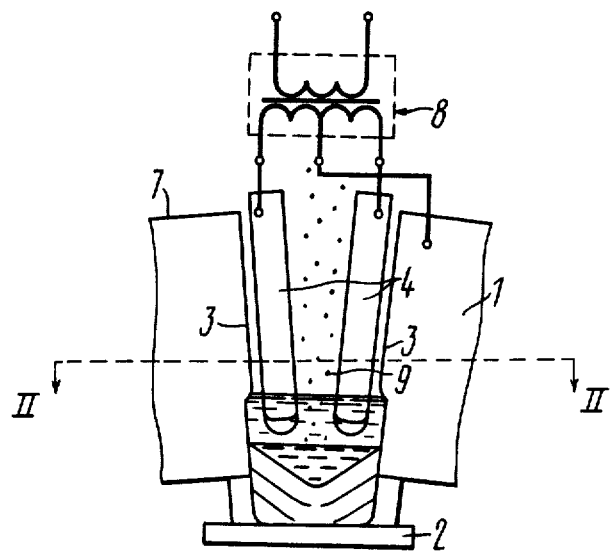
FIG. 1 schematically shows the arrangement of consumable plate electrodes for an accomplishment of the method of the invention.

In the method of the invention, blanks of a workpiece 1 to be welded (FIG. 1) are arranged on a water-cooled bottom plate 2. End faces 3 to be welded together of the workpiece 1 are set at the predetermined angle of divergence which is selected depending on the mass and sizes of the blanks being welded.

Next, consumable plate electrodes 4 are introduced into the welding gap.

In accordance with the invention, the electrodes 4 are disposed in pairs, one electrode in a pair opposite the other. Such a disposition of the electrodes ensures a uniform distribution of the heat input over the weld thickness. It is to be noted that the quantity of pairs of electrodes is selected depending on the width of the workpiece 1 being welded.

In addition, said electrodes 4 are positioned in the welding gap at an angle equal to the angle of divergence of the end faces 3 to be welded together, larger faces 5 (FIG. 2) of the electrodes 4 being parallel with the end faces 3. Thus, when the end faces 3 being welded together are turned, the gaps between the larger faces 5 of the electrodes 4 and the end faces 3 as well as the spacing of the electrodes 4 remain unchanged in the course of welding, which provides for a uniform and symmetrical fusion of the edges being welded together.

The amount of the gap between the larger faces 5 of the electrodes 4 and the end faces 3 being welded together affects the weld joint quality.

Figure 2:
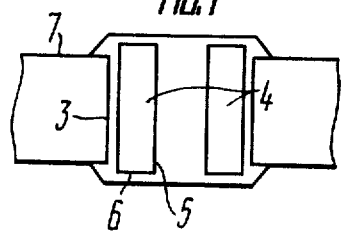
FIG. 2 is a sectional view taken along the line II—II in FIG. 1.

According to the invention, the larger faces 5 of the electrodes 4 are positioned so that they are spaced from the end faces 3 at a distance of 6 to 17% of the width of a smaller face 6 (FIG. 2).

For the purpose of this invention, the term "width of the smaller face 6" is intended to denote the minimum distance between the larger faces 5 of the electrodes 4.

The above range of the gap has been selected proceeding from that with a gap less than 6% of said width, breakdowns of the slag bath occur in the space between the electrode 4 and the end face 3 being welded, which impairs the stability of the process, while with a gap over 17% of the smaller face width, points of incomplete fusion of the edges being welded together arise and unfused particles appear in the weld metal.

The quality of the built-up metal has been found to be also affected by the amount of extension of the electrodes 4 beyond the side surface 7 of the workpiece 1 being welded (FIG. 1).

In accordance with the invention, the electrodes 4 are disposed so that the smaller faces 6 (FIG. 2) extend beyond the side surface 7 of the workpiece 1 being welded by a distance of 6 to 13% of their width.

It has been ascertained that extending the electrodes 4 beyond the side surface 7 for a distance less than 6% of the width of their smaller face 6 gives rise to points of incomplete fusion at the side surface 7 of the workpiece 1, and for a distance over 13%, enlarges the weld reinforcement and thereby increases the metal content of waste.

After the electrodes 4 have been installed, voltage from a power transformer 8 is applied, and then a slag bath is established with the use of a device for siphon pouring of liquid slag (not shown).

As the welding current has reached a predetermined value, feeding a ground metallic adding material 9 into the space between the electrodes 4 is started.

When the process is completed, the voltage applied to the consumable electrodes 4 is cut off, feeding the ground adding material 9 is stopped, the stubs of the consumable electrodes 4 and the device for siphon pouring of liquid slag are removed.

The proposed method ensures an uniform distribution of the heat input over the weld thickness and hence an uniform fusion of the edges and a higher crystallization-crack resistance of the weld metal.

The proposed method offers high dependability, efficiency, and simplicity.

The method of the invention makes it possible to produce high-quality weld joints in welding together blanks of poorly weldable steels.

Putting this method of electroslag welding with consumable plate electrodes into practice will make it possible to solve the problem of producing superlarge rolls for unique mills.

Described below are specific examples of accomplishment of the electroslag welding method of the invention.

Steels were welded having a high content of carbon (0.5 to 1.2%) and alloyed with nickel (1 to 1.5%), chromium (3 to 4%), molybdenum, vanadium and other elements. A ground metallic material of the same chemical composition as the blanks being welded together was fed into the welding gap.

EXAMPLE 1

Number of electrodes: 2

Welding section: 700 × 1,000 mm

Angle of divergence of end faces being welded together: 2°15'

The larger faces of the electrodes were parallel with the end faces being welded together and spaced therefrom at a distance of 9% of the width of their smaller face.

The smaller faces of the electrodes extended beyond the side surface by 11% of said width.

Examining the quality of the weld joint by known methods has shown a symmetrical uniform fusion of the workpiece edges. The metal of the weld, despite its large size, is of a fine-crystalline, non-oriented structure. Non-metallic inclusions in the weld are uniform and evenly distributed through the metal body.

By its chemical composition the weld metal differs but little from the basic metal.

EXAMPLE 2

All the conditions were the same as in Example 1, except that the larger faces of the electrodes were spaced from the end faces being welded together at a distance of 5% of the width of the smaller face of the electrodes.

Sharp variations of the welding conditions took place in the course of welding, which resulted in an impaired quality of the weld joint.

EXAMPLE 3

All the conditions were the same as in Example 1, except that the larger faces of the electrodes were spaced from the end faces being welded together at a distance of 18% of the width of the smaller face of the electrodes.

Defects in the form of unfused particles of the adding material as well as points of incomplete fusion over the weld depth have been found in the weld metal.

EXAMPLE 4

Welded together were round blanks of 2,500 mm in diameter.

Number of electrodes: 4

Angle of divergence of end faces being welded together: 1°36′

The larger faces of the electrodes were parallel with the end faces being welded together and spaced therefrom at a distance of 12% of the width of the smaller face of the electrodes. The smaller faces extended beyond the side surface of the workpiece being welded by 12% of said width.

The weld featured a high level of the physico-mechanical properties (see the Table). The built-up metal was free of defects in the form of cracks, various inclusions, etc.

TABLE

| Weld joint | $\sigma_T$ kgf/mm$^2$ | $\sigma_B$ kgf/mm$^2$ | $\sigma_S$ % | $\gamma$ % | $a_H$ kgf/cm |
|---|---|---|---|---|---|
| Weld | 60 | 98.5 | 14.1 | 16 | 1.4 |
| Weld area | 63 | 94.0 | 12.1 | 16 | 1.5 |
| Basic material | 60 | 94.6 | 10.1 | 16 | 1.5 |

EXAMPLE 6

All the conditions were the same as in Example 4, except that the smaller faces of the electrodes extended beyond the side surfaces of blanks by 17% of the width of the smaller face of the electrodes.

The weld was free from such defects as crystallization cracks or unused particles of the adding material. However, because of a weld reinforcement the metal content of waste was sharply increased.

While particular embodiments of the invention have been shown and described, various modifications thereof will be apparent to those skilled in the art and therefore it is not intended that the invention be limited to the disclosed embodiments or to the details thereof and departures may be made therefrom within the spirit and scope of the invention as defined in the claims.

What is claimed is:

1. A method for electroslag welding of workpieces in a welding gap, said workpieces having end faces and side surfaces, and said workpieces being welded with adding material and consumable plate electrodes, said electrodes having first faces and second faces, said method comprising:
    arranging the end faces of the workpieces that are to be welded together at a predetermined angle of divergence to form the welding gap;
    introducing the adding material and the electrodes into the welding gap;
    positioning the electrodes in the welding gap in pairs, one electrode of a pair opposite the other, at a divergent angle equal to the angle of divergence of the end faces to be welded together; and
    positioning the first faces of the electrodes parallel to the end faces of the electrodes to be welded together and the second faces of the electrodes extending beyond the side surfaces of the workpieces.

2. A method as claimed in claim 1, wherein the electrodes are arranged so that the first faces of the electrodes are spaced from the end faces of the workpieces being welded together at a distance of 6 to 17% of the width of the second faces of the electrodes.

3. A method as claimed in claim 1, wherein the electrodes are arranged so that the second faces of the electrodes extend beyond the side surfaces of the workpieces being welded by 6 to 13% of the width of said second faces.

* * * * *